United States Patent
Kondo et al.

(10) Patent No.: US 12,411,006 B2
(45) Date of Patent: Sep. 9, 2025

(54) ESTIMATION DEVICE

(71) Applicant: DENSO CORPORATION, Kariya (JP)

(72) Inventors: Katsuhiko Kondo, Nisshin (JP); Akiyoshi Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 417 days.

(21) Appl. No.: 17/658,226

(22) Filed: Apr. 6, 2022

(65) Prior Publication Data

US 2022/0228861 A1 Jul. 21, 2022

Related U.S. Application Data

(63) Continuation of application No. PCT/JP2020/036965, filed on Sep. 29, 2020.

(30) Foreign Application Priority Data

Oct. 9, 2019 (JP) .................. 2019-186316

(51) Int. Cl.
*G01B 15/02* (2006.01)
*G01S 13/931* (2020.01)

(52) U.S. Cl.
CPC ............ *G01B 15/02* (2013.01); *G01S 13/931* (2013.01)

(58) Field of Classification Search
CPC ................ G01B 15/02; G01S 13/931
See application file for complete search history.

(56) References Cited

U.S. PATENT DOCUMENTS

| | | |
|---|---|---|
| 6,122,040 A | 9/2000 | Arita et al. |
| 2002/0189875 A1 | 12/2002 | Asanuma et al. |
| 2009/0015462 A1 * | 1/2009 | Nakanishi ............ G08G 1/167 |
| | | 342/107 |
| 2016/0349356 A1 | 12/2016 | Takaki |
| 2017/0261601 A1 | 9/2017 | Takaki |
| 2017/0363718 A1 | 12/2017 | Ishimori |
| 2018/0365846 A1 * | 12/2018 | Sumiyoshi ............... G06T 7/11 |
| 2019/0219673 A1 | 7/2019 | Morinaga et al. |
| 2020/0076090 A1 * | 3/2020 | Franzini ................ H01Q 21/26 |
| 2022/0206110 A1 * | 6/2022 | Goda .................... G01S 15/931 |

FOREIGN PATENT DOCUMENTS

| | | | |
|---|---|---|---|
| JP | 8-5395 A | | 1/1996 |
| JP | 2002-228749 A | | 8/2002 |
| JP | 2015075382 A | * | 4/2015 |
| JP | 2016-205922 A | | 12/2016 |
| JP | 2018-004598 A | | 1/2018 |
| JP | 6386412 B | | 9/2018 |
| JP | 2021-060369 A | | 4/2021 |
| JP | 2021-060371 A | | 4/2021 |

* cited by examiner

*Primary Examiner* — Vladimir Magloire
*Assistant Examiner* — Maxine McKenzie Phillips
(74) *Attorney, Agent, or Firm* — Maschoff Brennan

(57) ABSTRACT

An estimation device mounted to a mobile object comprises an acquisition unit, an extraction unit, and an estimation unit. The acquisition unit acquires reflection point information for each of a plurality of reflection points detected by a radar device mounted to the mobile object. The extraction unit extracts, among the plurality of reflection points, at least one road surface reflection point detected by reflection on a road surface, based on at least the reflection point information. The estimation unit estimates a device height which is the height of the radar device mounted to the mobile object, based on at least a road surface reflection point distance which is the distance from the radar device to the road surface reflection point.

6 Claims, 13 Drawing Sheets

○ : REFLECTION POINT

| DEVICE SYSTEM COORDINATES OF ROAD SURFACE REFLECTION POINT | EXTRACTION FREQUENCY P |
|---|---|
| $(x_s, y_s)$ | N |
| ... | ... |

ESTIMATION DEVICE

CROSS-REFERENCE TO RELATED APPLICATION

The present application is a continuation application of International Application No. PCT/JP2020/036965, filed on Sep. 29, 2020, which claims priority to Japanese Patent Application No. 2019-186316, filed on Oct. 9, 2019. The contents of these applications are incorporated herein by reference in their entirety.

BACKGROUND

Technical Field

The present disclosure relates to an estimation device.

Background Art

There is a known technique for estimating the positional deviation of a radar device in the height direction. For example, a technique in which the own vehicle and an oncoming vehicle both have a radar device, and the deviation in the height direction is estimated based on the amount of difference between the height of the radar device of the own vehicle detected by the oncoming vehicle and the height of the radar device previously stored in the own vehicle, is disclosed.

SUMMARY

In the present disclosure, provided is an estimation device as the following.

The estimation device mounted to a mobile object comprises an acquisition unit, an extraction unit, and an estimation unit. The acquisition unit acquires reflection point information for each of a plurality of reflection points detected by a radar device mounted to the mobile object. The extraction unit extracts, among the plurality of reflection points, at least one road surface reflection point detected by reflection on a road surface, based on at least the reflection point information. The estimation unit estimates a device height which is the height of the radar device mounted to the mobile object, based on at least a road surface reflection point distance which is the distance from the radar device to the road surface reflection point.

DETAILED DESCRIPTION OF THE PREFERRED EMBODIMENTS

PTL 1 below discloses a technique in which the own vehicle and an oncoming vehicle both have a radar device, and the deviation in the height direction is estimated based on the amount of difference between the height of the radar device of the own vehicle detected by the oncoming vehicle and the height of the radar device previously stored in the own vehicle.

[PTL 1] JP 6386412 B

However, as a result of detailed examination by the inventor, the technique disclosed in PTL 1 was found to have a problem that the deviation in the height direction cannot be estimated only by the own vehicle.

An aspect of the present disclosure provides a technique that can estimate the deviation of the radar device in the height direction only by the own vehicle.

An aspect of the present disclosure is an estimation device mounted to a mobile object, and comprising an acquisition unit, an extraction unit, and an estimation unit. The acquisition unit is configured to acquire reflection point information for each of a plurality of reflection points detected by a radar device mounted to the mobile object. The reflection point information includes at least an azimuth angle of the corresponding one of the reflection points and the distance from the radar device to the corresponding one of the reflection points, the azimuth angle being a horizontal angle and a vertical angle obtained with reference to a beam direction which is a direction along a central axis of a radar beam. The extraction unit is configured to extract, among the plurality of reflection points, at least one road surface reflection point detected by reflection on a road surface, based on at least the reflection point information. The estimation unit is configured to estimate a device height which is the height of the radar device mounted to the mobile object, based on at least a road surface reflection point distance which is a distance from the radar device to the road surface reflection point.

With such a configuration, the device height can be estimated only by the own vehicle without using the detection results by another vehicle. As a result, the deviation of the radar device in the height direction can be estimated only by the own vehicle.

Exemplary embodiments of the present disclosure will be described below with reference to the drawings. The term "vertical" mentioned below is not limited to "vertical" in the strict sense of the word, and does not have to be strictly "vertical" as long as the same effect is achieved. The same applies to the terms "horizontal" and "consistent" mentioned below.

1. First Embodiment

1-1. Configuration

Figure 1:
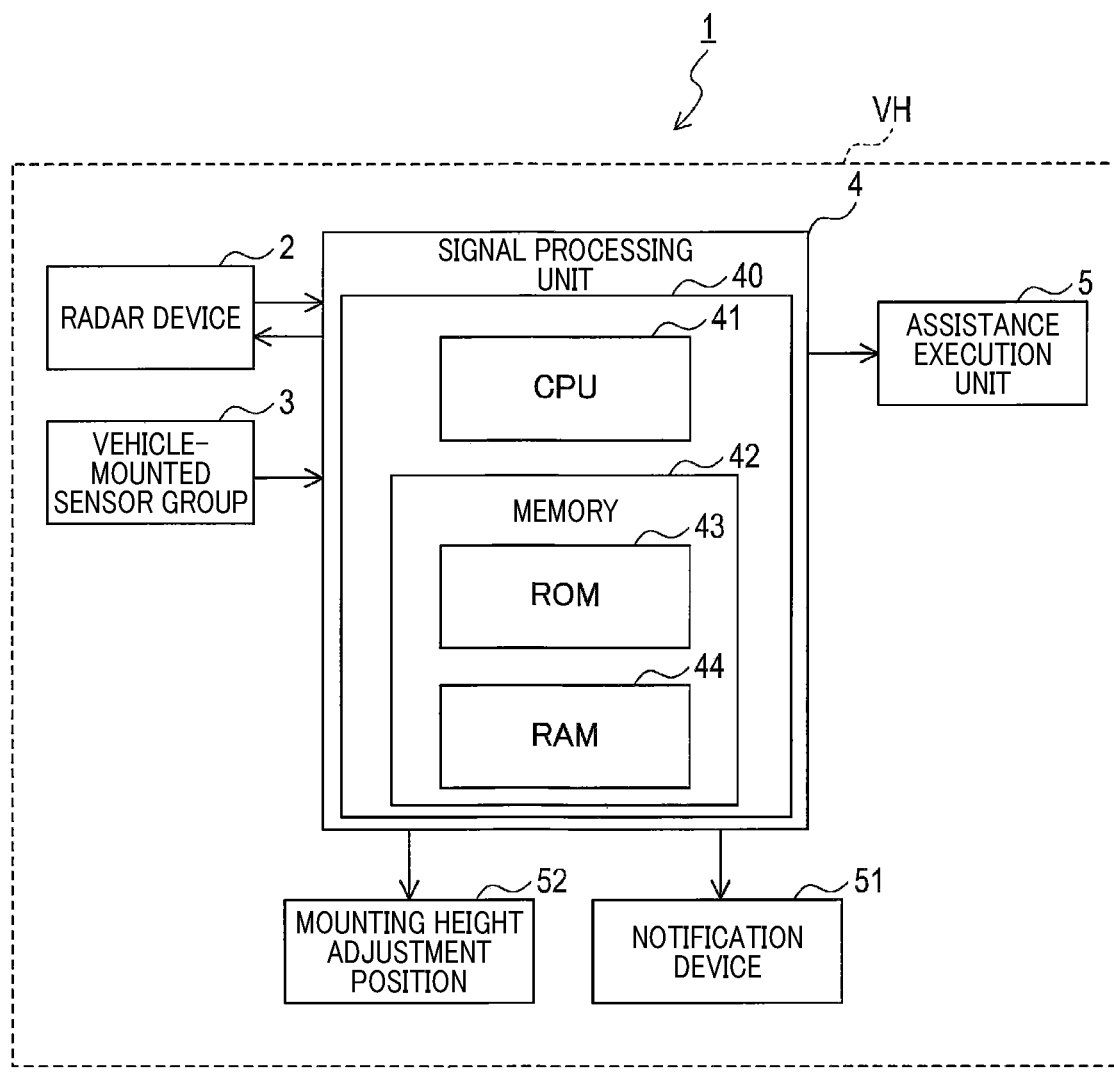
FIG. 1 is a block diagram illustrating the configuration of a vehicle control system.

The vehicle control system 1 shown in FIG. 1 is mounted to a vehicle VH, which is a mobile object. The vehicle control system 1 comprises a radar device 2, a vehicle-mounted sensor group 3, a signal processing unit 4, and an assistance execution unit 5. In addition, the vehicle control system 1 may comprise a notification device 51 and a mounting height adjustment device 52. Hereinafter, the vehicle VH to which the vehicle control system 1 is mounted is also referred to as "own vehicle VH." Further, the vehicle width direction and vehicle height direction of the own vehicle VH are also referred to as "horizontal direction" and "vertical direction," respectively.

Figure 2:
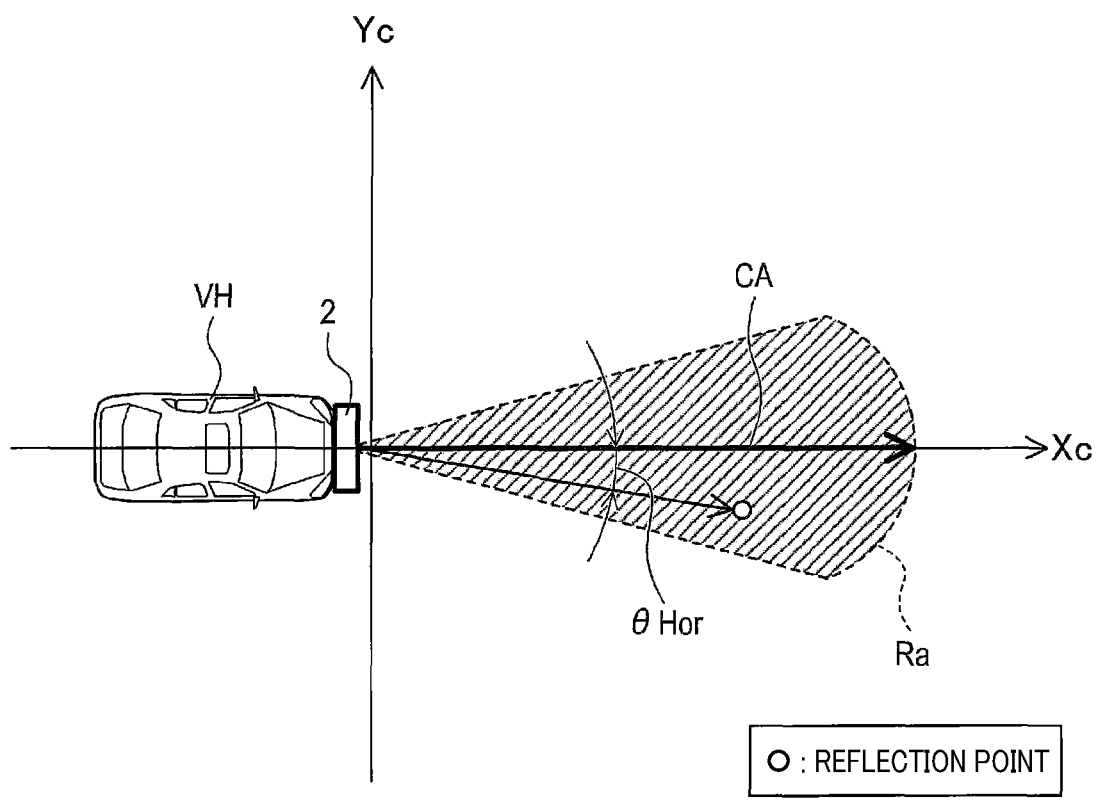
FIG. 2 is an explanatory diagram explaining the radiation region of radar waves in the horizontal direction.
Figure 3:
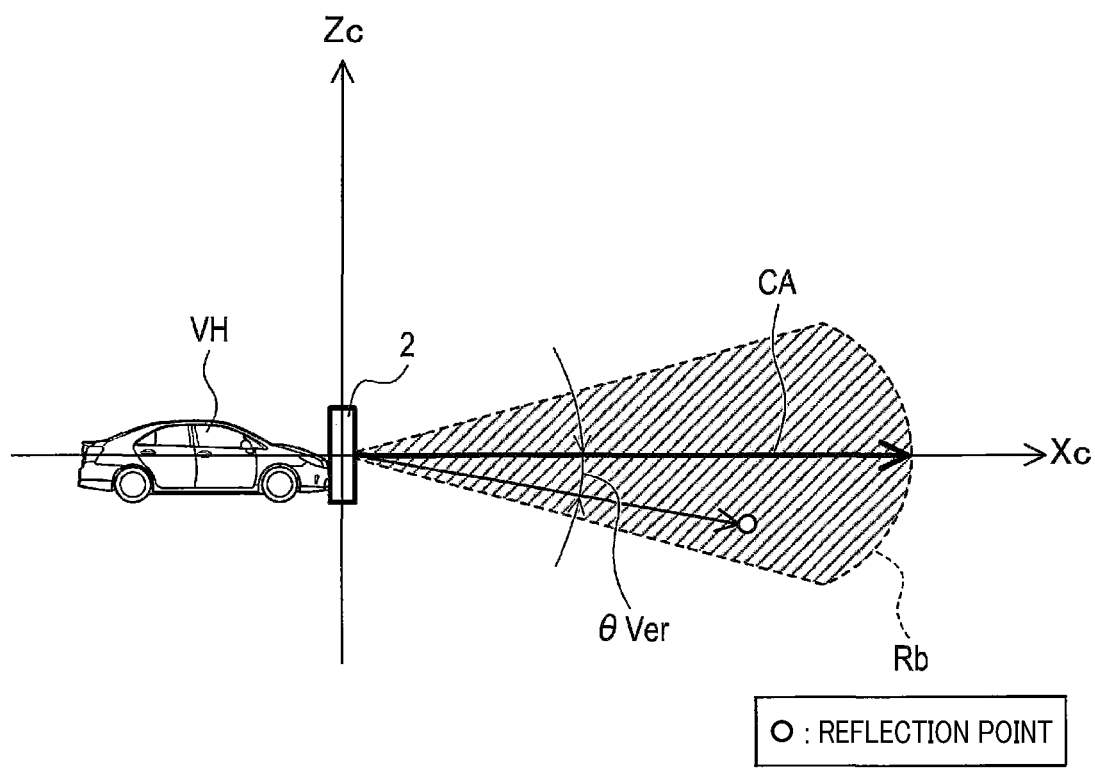
FIG. 3 is an explanatory diagram explaining the radiation region of radar waves in the vertical direction.

The radar device 2 is mounted on the front side of the own vehicle VH, as shown in FIGS. 2 and 3. The radar device 2 emits radar waves within a predetermined angle range Ra in the horizontal direction in front of the own vehicle VH, and within a predetermined angle range Rb in the vertical direction in front of the own vehicle VH. The radar device 2 receives reflected waves of the emitted radar waves to generate reflection point information related to reflection points in which the radar waves are reflected.

The radar device 2 may be the so-called millimeter wave radar that uses electromagnetic waves in the millimeter waveband as radar waves, a laser radar that uses laser light as radar waves, or a sonar that uses sound waves as radar waves. In any case, an antenna part that transmits and receives radar waves is configured to be able to detect the arrival directions of the reflected waves for both the horizontal and vertical directions. The antenna part may comprise array antennas arranged in the horizontal and vertical directions.

In the present embodiment, the radar device 2 is attached so that the beam direction is consistent with the front and back direction, i.e., the traveling direction, of the own vehicle VH, and is used to detect various targets present in front of the own vehicle VH. The beam direction refers to a direction along the central axis CA direction of the emitted radar beam. The radar device 2 generates reflection point information.

The reflection point information relates to reflection points. The reflection point information includes at least the azimuth angle of each reflection point and the distance to each reflection point. The distance to the reflection point is the distance between the radar device 2 and the reflection point. The radar device 2 may be configured to detect the relative speed of the reflection point with respect to the own vehicle VH, and the received strength of the radar beam reflected at the reflection point. The reflection point information may include the relative speed of the reflection point and the received strength.

The azimuth angle of the reflection point is at least one of an angle in the horizontal direction (hereinafter, "horizontal angle") Hor and an angle in the vertical direction (hereinafter, "vertical angle") Ver, where the reflection point is present, obtained with reference to the beam direction which is a direction along the central axis CA of the radar beam, as shown in FIGS. 2 and 3. In the present embodiment, the reflection point information includes both of the vertical angle Ver and horizontal angle Hor as information indicating the azimuth angles of the reflection point.

In the present embodiment, the radar device 2 employs a FMCW system, alternately transmits radar waves in an up-modulation section and radar waves in a down-modulation section with a predetermined modulation period, and receives the reflected radar waves. FMCW is an abbreviation of "Frequency Modulated Continuous Wave." In the present embodiment, the radar device 2 detects, for every modulation period, the horizontal angle Hor and vertical angle Ver, which are the azimuth angles of the reflection point, the distance to the reflection point, the relative speed of the reflection point, and the received power of the received radar waves as reflection point information, as described above. Hereinafter, the received power of the received radar waves is referred to as "the reflected power."

The vehicle-mounted sensor group 3 is at least one sensor mounted to the own vehicle VH to detect the condition etc. of the own vehicle VH. The vehicle-mounted sensor group 3 may include a vehicle speed sensor. The vehicle speed sensor detects the vehicle speed based on the rotation of the wheels. The vehicle-mounted sensor group 3 may also include a camera. The camera captures images in the same region as the radiation region of the radar waves by the radar device 2. The vehicle-mounted sensor group 3 may also include an acceleration sensor. The acceleration sensor detects the acceleration of the own vehicle VH. The vehicle-mounted sensor group 3 may also include a yaw rate sensor. The yaw rate sensor detects the change rate of the yaw angle, which represents the inclination of the traveling direction of the own vehicle VH with respect to the front of the own vehicle VH.

The signal processing unit 4 comprises a microcomputer 40. The microcomputer 40 comprises CPU 41, ROM 43, RAM 44, and a semiconductor memory such as flash memory (hereinafter, "memory 42"). The CPU 41 executes a program. The ROM 43 stores the program executed by the CPU 41, data referred to during execution of the program, and the like. The RAM 44 temporarily stores the data.

Figure 4:
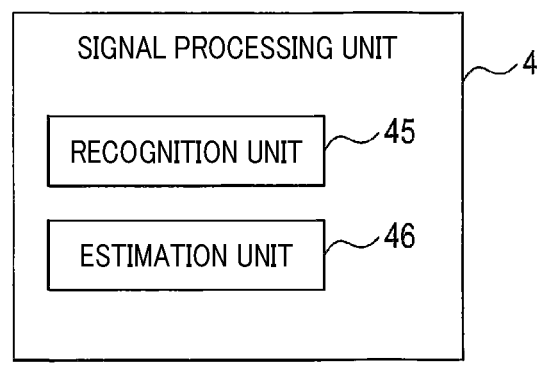
FIG. 4 is a block diagram explaining the function of a signal processing unit.

As configurations of the function realized by executing the program by the CPU 41, the signal processing unit 4 comprises at least a recognition unit 45 and an estimation unit 46, as shown in FIG. 4.

The assistance execution unit 5 controls various vehicle-mounted devices based on the processing results in the recognition unit 45 provided in the signal processing unit 4 to execute predetermined driving assistance. The various vehicle-mounted devices to be controlled may include a monitor for displaying images, and audio equipment for outputting alarm sounds or guidance voices. In addition, the various vehicle-mounted devices may include a control device that controls the internal combustion engine, power train mechanism, brake mechanism, and the like of the own vehicle VH.

The notification device 51 is an audio output device installed in the cabin, and outputs an alarm sound to the passenger of the own vehicle VH. The audio equipment etc. provided in the assistance execution unit 5 may be used as the notification device 51.

The mounting height adjustment device 52 comprises a motor, and a gear attached to the radar device 2. The mounting height adjustment device 52 rotates the motor according to a drive signal output from the signal processing unit 4. As a result, the rotational force of the motor is transmitted to the gear to move the radar device 2 up and down in the vertical direction.

1-2. Processing

Recognition Unit

The recognition unit 45 performs the function of target recognition. The function of target recognition is a function to detect the lane on which the own vehicle VH is traveling, the preceding vehicle traveling in the same lane as the own vehicle VH, other obstacles, and the like, based on the reflection point information obtained from the radar device 2 and various types of information obtained from the vehicle-mounted sensor group 3. The result of target recognition is output to the assistance execution unit 5 etc.

Estimation Unit

The radar device 2 is attached to the own vehicle VH accurately in a predetermined position in the initial state, for example, as shipped from the factory. The initial height mentioned below refers to the height of the radar device 2 from the road surface at this time. For example, the initial height is previously stored in the memory 42, such as ROM 43. Based on the detection result of the radar device 2 installed at the initial height, the function of target recognition is realized with high accuracy in the recognition unit 45 described above.

Figure 5:
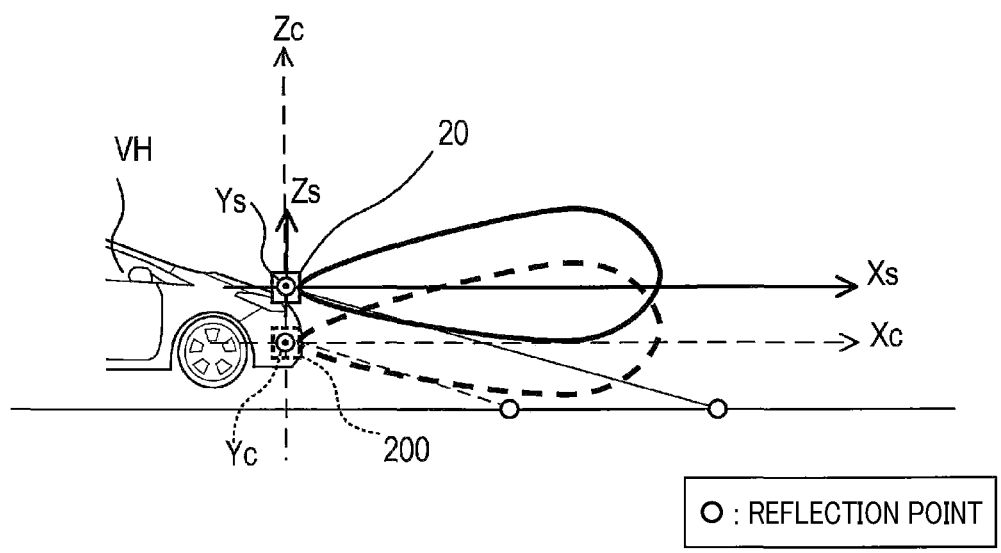
FIG. 5 is an explanatory diagram explaining the positional deviation of a radar device in the height direction.

However, in the own vehicle VH, height deviation may occur in the radar device 2. FIG. 5 shows an example of height deviation. The radar device 200 shown by the dotted line is a radar device installed at an initial height F. Height deviation may occur, for example, when the user replaces the tire of the own vehicle VH with a tire with a tire diameter different from that when the initial height has been stored, or when the user replaces the suspension of the own vehicle VH with a suspension different from that when the initial height has been stored.

Accordingly, the estimation unit 46 performs the function of estimating the device height of the radar device 2 and the amount of height deviation based on adjustment processing, described later. The estimation unit 46 realizes the function by adjustment processing. The device height is the height of the radar device 2 mounted to the own vehicle VH, and is the height from the road surface. The term "height deviation" refers to a state in which the position of the radar device 2 is deviated from the initial height, which is the predetermined height, in the vertical direction. The amount of height deviation expresses the degree of height deviation as the distance.

The coordinate axes of the own vehicle VH and the coordinate axes of the radar device 2 are described here. The coordinate axes of the own vehicle VH refer to, as shown in FIGS. 2 and 3, a vertical axis Zc extending in the vertical direction, a horizontal axis Yc extending in the horizontal direction, and a traveling direction axis Xc extending in the traveling direction of the own vehicle VH. The vertical axis Zc, horizontal axis Yc, and traveling direction axis Xc intersect with each other.

On the other hand, the coordinate axes of the radar device 2 refer to, as shown in FIG. 5, an up-down axis Zs extending above and below the radar device 2, a left-right axis Ys extending to the left and right of the radar device 2, and a front-back axis Xs extending to the front and back of the radar device 2, in a state in which the radar device 2 is attached to the own vehicle VH. The up-down axis Zs, left-right axis Ys, and front-back axis Xs intersect with each other. The device system coordinates refer to coordinates expressed based on the coordinate axes of the radar device 2.

In the present embodiment, in which the radar device 2 is installed on the front side of the own vehicle VH, the front-back axis Xs is equal to the central axis CA. That is, the amount of height deviation corresponds to the distance in the vertical direction between the traveling direction axis Xc and the front-back axis Xs of the radar device 2.

1-2-1. Adjustment Processing

The adjustment processing executed by the estimation unit 46 will be described using the flowchart of FIG. 6. This processing is started when an ignition switch is turned on.

When this processing is activated, the estimation unit 46 acquires the reflection point information described above from the radar device 2 in S10. The reflection point information is information on each of a plurality of reflection points detected by the radar device 2 mounted to the own vehicle VH, as described above, and includes at least the horizontal and vertical angles as the azimuth angles, and the distance from the radar device 2 to each reflection point. Hereinafter, the reflection points identified from the reflection point information are referred to as "acquired reflection points." Further, the estimation unit 46 acquires various detection results, including own vehicle speed Cm, from the vehicle-mounted sensor group 3.

The estimation unit 46 executes road surface reflection extraction processing in S20. The road surface reflection extraction processing is to extract, from the acquired reflection points, a road surface reflection point, which is a reflection point on the road surface. The road surface reflection point refers to at least one reflection point detected by reflection on the road surface. The details of the road surface reflection extraction processing will be described later.

The estimation unit 46 executes calculation processing in S30. The calculation processing is to arithmetically estimate the device height based on at least a road surface reflection point distance. The road surface reflection point distance is the distance from the radar device 2 to the road surface reflection point.

The estimation unit 46 identifies the amount of height deviation in S40. In the present embodiment, the amount of height deviation refers to the difference between the device height estimated in S30 and the initial height. The estimation unit 46 stores the identified amount of height deviation in the memory 42.

The estimation unit 46 determines in S50 whether adjustment by the mounting height adjustment device 52 is necessary, based on the amount of height deviation estimated in S30. Specifically, the estimation unit 46 determines that adjustment is necessary when the amount of height deviation is equal to or more than a threshold distance, which is a predetermined distance. That is, the threshold distance represents the amount of deviation of the radar device 2 in the vertical direction, which requires adjustment by the mounting height adjustment device 52. The threshold distance may be previously stored in the memory 42.

The estimation unit 46 moves the processing to S90 when the amount of height deviation is less than the threshold distance and adjustment is not necessary, and moves the processing to S60 when the amount of height deviation is equal to or more than the threshold distance and adjustment is necessary.

The estimation unit 46 determines in S60 whether the amount of height deviation estimated in S40 is within the adjustable range by the mounting height adjustment device 52. The estimation unit 46 moves the processing to S70 when the amount of height deviation estimated in S40 is within the adjustable range, and moves the processing to S80 when the amount of height deviation is not within the adjustable range. The adjustable range may be previously stored in the memory 42.

In S70, the estimation unit 46 allows the mounting height adjustment device 52 to adjust the device height by the amount of height deviation estimated in S40. That is, the estimation unit 46 adjusts the device height by moving the radar device 2 up and down by the amount of height deviation in the vehicle height direction centered on the front-back axis Xs of the radar device 2. Then, the estimation unit 46 terminates the adjustment processing.

The estimation unit 46 may calculate the position coordinates of the reflection point acquired in S10 in processing different from this adjustment processing, and may correct the position coordinates by increasing or decreasing the height in the calculated position coordinates by the amount of height deviation estimated in S40. Then, the recognition unit 45 may execute target recognition described above based on the corrected position coordinates of the reflection point.

In S80, the estimation unit 46 outputs diagnostic information, which indicates that height deviation occurs in the radar device 2, to an external device of the estimation unit 46. Hereinafter, the diagnostic information indicating that height deviation occurs in the radar device 2 is referred to as "height deviation diagnosis." The external device may be the notification device 51. The estimation unit 46 may output height deviation diagnosis to, for example, the notification device 51. The notification device 51 may output an alarm sound according to the height deviation diagnosis.

The estimation unit 46 determines in S90 whether the ignition switch is turned off. When the ignition switch is not turned off, the estimation unit 46 moves the processing to S10. On the other hand, when the ignition switch is turned off, the estimation unit 46 terminates this adjustment processing.

1-2-2. Road Surface Reflection Extraction Processing

Figure 7:
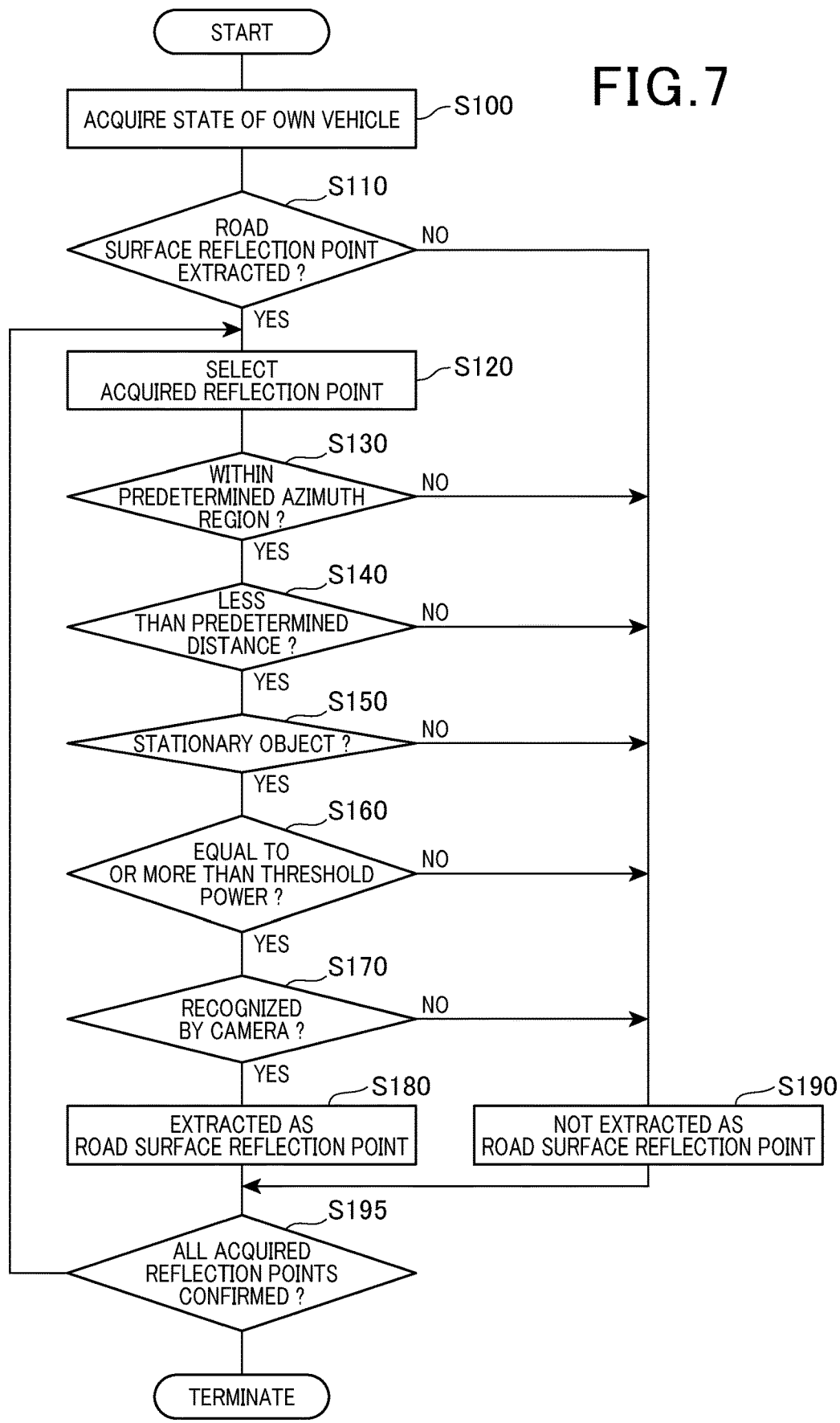
FIG. 7 is a flowchart of road surface reflection extraction processing.

Next, the road surface reflection extraction processing executed by the estimation unit 46 in S20 of the adjustment processing will be described using the flowchart of FIG. 7.

In S100, the estimation unit 46 acquires detection results, such as the state of the own vehicle VH, by various sensors from the vehicle-mounted sensor group 3. The detection results as mentioned herein may include the vehicle speed, acceleration, yaw angle, and the like of the own vehicle VH.

The estimation unit 46 determines in S110 whether a road surface reflection point is to be extracted, based on the detection results, such as the state of the own vehicle VH, acquired from the vehicle-mounted sensor group 3.

Specifically, the estimation unit 46 determines whether the vehicle body of the own vehicle VH is stable relative to the road surface based on the detection results, such as the state of the own vehicle VH, and determines that when the vehicle body of the own vehicle VH is stable relative to the road surface, a road surface reflection point is to be extracted.

The state in which the vehicle body of the own vehicle VH is stable relative to the road surface may be a state in which the vehicle body of the own vehicle VH is not inclined to the road surface, or a state in which the vehicle body of the own vehicle VH does not move up or down with respect to the road surface. In other words, the state in which the vehicle body of the own vehicle VH is stable relative to the road surface may be a state in which the own vehicle VH is not travelling on a curved road with high curvature, or a state in which the own vehicle VH is not travelling on a road surface with large irregularities.

It can be said that not traveling on a road surface with large irregularities is equivalent to traveling on a flat road surface. In this case, it is considered that the speed and acceleration are higher than those when travelling on a road surface with large irregularities. On the other hand, it can be said that not traveling on a curve road with high curvature is close to traveling on a straight road. In this case, the speed and acceleration are higher than those when traveling on a curved road with high curvature, and the change rate of the yaw angle is smaller than that when traveling on a curved road with high curvature in many cases.

Accordingly, when the vehicle speed of the own vehicle VH is equal to or more than a predetermined vehicle speed threshold value, the estimation unit 46 may determine that the vehicle body of the own vehicle VH is stable relative to the road surface, and that a road surface reflection point is to be extracted. That is, when the vehicle speed of the own vehicle VH is less than the vehicle speed threshold value, the estimation unit 46 may determine that the vehicle body of the own vehicle VH is not stable relative to the road surface, and that a road surface reflection point is not to be extracted.

Similarly, when the acceleration of the own vehicle VH is equal to or more than a predetermined acceleration threshold value, the estimation unit 46 may determine that the vehicle body of the own vehicle VH is stable relative to the road surface, and that a road surface reflection point is to be extracted. Similarly, when the change rate of the yaw angle of the own vehicle VH is less than a predetermined threshold value, the estimation unit 46 may determine that the vehicle body of the own vehicle VH is stable relative to the road surface, and that a road surface reflection point is to be extracted.

The estimation unit 46 moves the processing to S120 when it is determined that a road surface reflection point is to be extracted, and moves the processing to S180 when it is determined that a road surface reflection point is not to be extracted.

The estimation unit 46 selects one acquired reflection point from all of the acquired reflection points in S120. The estimation unit 46 executes the processing of S130 to S195 on the selected acquired reflection point (hereinafter, simply referred to as "the acquired reflection point").

The estimation unit 46 determines in S130 whether the acquired reflection point is located within an extraction region, which is a predetermined azimuth region, including the central axis CA, in the horizontal direction. The estimation unit 46 moves the processing to S140 when the acquired reflection point is located within the azimuth region, and moves the processing to S190 when the selected acquired reflection point is not located within the azimuth region.

That is, the estimation unit 46 extracts, from the plurality of acquired reflection points, an acquired reflection point located within the extraction region. The extraction region may be set, for example, in the region of ±several degrees to several tens of degrees, including the central axis CA, in the horizontal direction. In other words, in the present embodiment, in which the radar device 2 is installed on the front side of the own vehicle VH, the extraction region may be set as a predetermined region around the traveling direction of the own vehicle VH. The extraction region may be determined by experiments etc. The extraction region is previously stored in the memory 42.

The estimation unit 46 determines in S140 whether the distance from the radar device 2 to the selected acquired reflection point is less than a predetermined distance threshold value. The estimation unit 46 moves the processing to S150 when the distance to the selected acquired reflection point is less than the distance threshold value, and moves the processing to S190 when the distance to the selected acquired reflection point is equal to or more than the distance threshold value.

That is, the estimation unit 46 extracts an acquired reflection point with a distance from the radar device 2 being less than the distance threshold value. The distance threshold value is previously stored in the memory 42.

The estimation unit 46 determines in S150 whether the acquired reflection point is a static reflection point. The estimation unit 46 moves the processing to S160 when the acquired reflection point is a static reflection point, and moves the processing to S190 when the acquired reflection point is not a static reflection point. The static reflection point is a reflection point in which the radar waves are reflected on a stationary object.

That is, the estimation unit 46 extracts the static reflection point from the acquired reflection points. Specifically, the estimation unit 46 may extract, as the static reflection point, an acquired reflection point that satisfies $\varepsilon_1 \leq q/Cm < \varepsilon_2$, wherein Cm is the own vehicle speed acquired in S10, q is the relative speed included in the reflection point information, $\varepsilon_1$ is a preset lower-limit speed threshold value, and $\varepsilon_2$ is a preset upper-limit speed threshold value. That is, an acquired reflection point in which the ratio of the own vehicle speed Cm to the relative speed q is within a predetermined speed threshold value range, such as $\varepsilon_1$ or more and less than $\varepsilon_2$, may be extracted as the static reflection point.

When the direction from the static reflection point toward the radar device 2 is consistent with the beam direction, the own vehicle speed Cm and the relative speed q of the reflection point are the same magnitude, and the direction of the relative speed q is opposite to that of the own vehicle speed Cm, thereby satisfying q/Cm=−1. Thus, a reflection point that satisfies q/C=−1 is considered as a static reflection point.

However, the own vehicle speed Cm acquired from the vehicle-mounted sensor group 3 is not always consistent with the actual vehicle speed due to wheel slippage, etc. Moreover, the relative speed q detected by the radar device 2 also includes errors. Therefore, even if it is a static reflection point, it may not always satisfy q/Cm=−1. The lower-limit speed threshold value $\varepsilon_1$ and the upper-limit speed threshold value $\varepsilon_2$ may be values appropriately set in consideration of these influences.

The estimation unit 46 determines in S160 whether the reflected power of the acquired reflection point is less than a predetermined power threshold value. The estimation unit 46 moves the processing to S170 when the reflected power of the acquired reflection point is less than the power threshold value, and moves the processing to S190 when the reflected power of the acquired reflection point is equal to or more than the power threshold value.

That is, the estimation unit 46 extracts the acquired reflection point in which the reflected power is less than the power threshold value. The reflected power from the road surface is considered to be smaller than the reflected power from another vehicle, for example. The power threshold value may be appropriately determined based on the reflected power from the road surface. For example, the power threshold value may be previously determined by experiments etc. The power threshold value is previously stored in the memory 42.

The estimation unit 46 determines in S170 whether the acquired reflection point is identified as the road surface in an image captured by a camera. The estimation unit 46 moves the processing to S180 when the acquired reflection point is estimated as the road surface in the captured image, and moves the processing to S195 when the acquired reflection point is not estimated as the road surface in the captured image.

That is, the estimation unit 46 extracts the acquired reflection point that is identified as the road surface in the captured image. The estimation unit 46 may be configured to acquire an image captured by a camera and to estimate the azimuth region of the acquired reflection point identified as the road surface in the captured image in processing different from this adjustment processing.

The estimation unit 46 determines in S180 that the acquired reflection point is a road surface reflection point, stores the three-dimensional coordinates of the acquired reflection point as the road surface reflection point in the memory 42, and moves the processing to S195.

The estimation unit 46 determines in S190 that the acquired reflection point is not a road surface reflection point, and moves the processing to S195 without storing it in the memory 42.

The estimation unit 46 determines in S195 whether the confirmation on whether all of the acquired reflection points are road surface reflection points is completed. When the confirmation is not completed, the estimation unit 46 moves the processing to S110 and repeats the processing of S110 to S195. On the other hand, when the confirmation is completed, the estimation unit 46 terminates this road surface reflection extraction processing.

That is, in the road surface extraction processing of the present embodiment, among the acquired reflection points, an acquired reflection point that satisfies all of the following (a) to (d) is extracted as a road surface reflection point.

(a) The point is located within the extraction region, including the central axis CA, in the horizontal direction.

(b) The distance from the radar device 2 is less than the distance threshold value.

(c) The point is a static reflection point.

(d) The reflected power is less than the power threshold value.

(e) The point is identified as the road surface in the image captured by the camera.

The road surface reflection extraction processing may be configured to satisfy at least (a) among (a) to (e) above. That is, the road surface reflection extraction processing may be configured to satisfy (a), and further satisfy at least one of (b) to (e). Alternatively, the road surface reflection extraction processing may be configured to satisfy at least (a) and (b). That is, the road surface reflection extraction processing may be configured to satisfy (a) and (b), and further satisfy at least one of (c) to (e).

1-2-3. Calculation Processing

Figure 8:
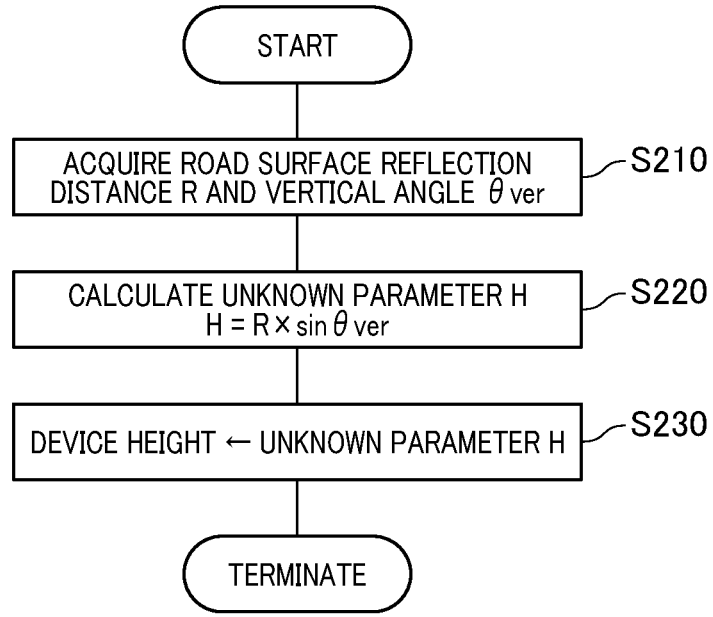
FIG. 8 is a flowchart of the calculation processing of the first embodiment.

Next, the calculation processing executed by the estimation unit 46 in S30 of the adjustment processing will be described using the flowchart of FIG. 8.

In S210, the estimation unit 46 acquires, for at least one surface reflection point identified in S20, the distance to the road surface reflection point, and the vertical angle $\theta_{Ver}$ as the azimuth angle of the road surface reflection point, based on the reflection point information.

Figure 9:
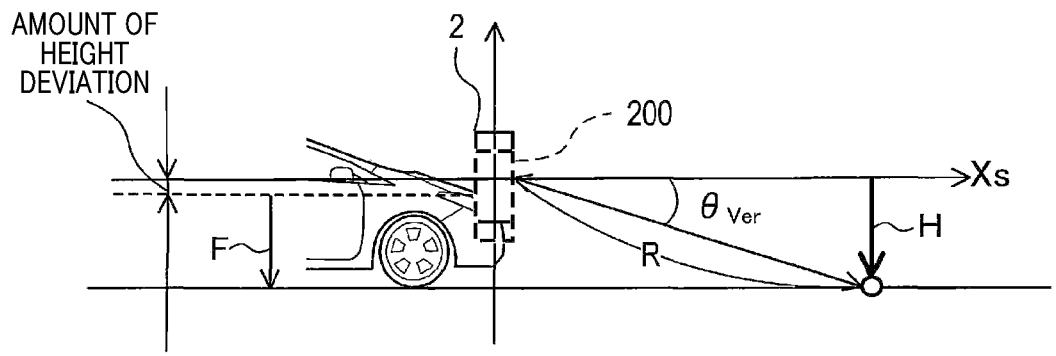
FIG. 9 is an explanatory diagram explaining the estimation of the amount of height deviation in the first embodiment.

In S220, the estimation unit 46 calculates the estimated height of the radar device 2 (i.e., device height) as an unknown parameter H. As shown in FIG. 9, the unknown parameter H is represented by the following formula (1) based on the road surface reflection distance R and the vertical angle θ.

[Equation 1]

$$H \times R \times \sin \theta ver \quad (1)$$

In S230, the estimation unit 46 estimates the unknown parameter H calculated in S220 as the device height. When there is a plurality of road surface reflection points, the estimation unit 46 may calculate unknown parameters H for the respective road surface reflection points and estimate their average value as the device height. The estimation unit 46 stores the thus-estimated device height in the memory 42, and terminates this calculation processing.

1-3. Effects (1a) In S30, the signal processing unit 4 estimates the device height, which is the height of the radar device 2 mounted to the own vehicle VH, based on at least the road surface reflection point distance. As a result, the device height can be estimated only by the own vehicle VH without communication with another vehicle. It is also possible to estimate height deviation only by the own vehicle VH.

(1b) In S30, the signal processing unit 4 may calculate the device height as the unknown parameter H based on formula (1), which is a relational expression established between the unknown parameter H, the road surface reflection point distance R, and the vertical angle $\theta v_{er}$. As a result, the device height can be accurately calculated based on the relational expression.

(1c) In S40, the signal processing unit 4 may estimate the difference between the device height estimated in S30 and the initial height as the amount of height deviation. As a result, the amount of height deviation can be estimated only by the own vehicle VH.

2. Second Embodiment 2-1. Configuration

Since the basic configuration of the second embodiment is the same as that of the first embodiment, only the difference will be described below. The same signs as those of the first embodiment indicate the same configurations, and a reference is made to the preceding description.

In the first embodiment described above, the signal processing unit 4 arithmetically estimates the device height based on formula (1). In contrast, in the second embodiment, the signal processing unit 4 statistically estimates the device height based on correspondence information, described later, which is different from the first embodiment.

2-2. Processing 2-2-1. Adjustment Processing

Figure 10:
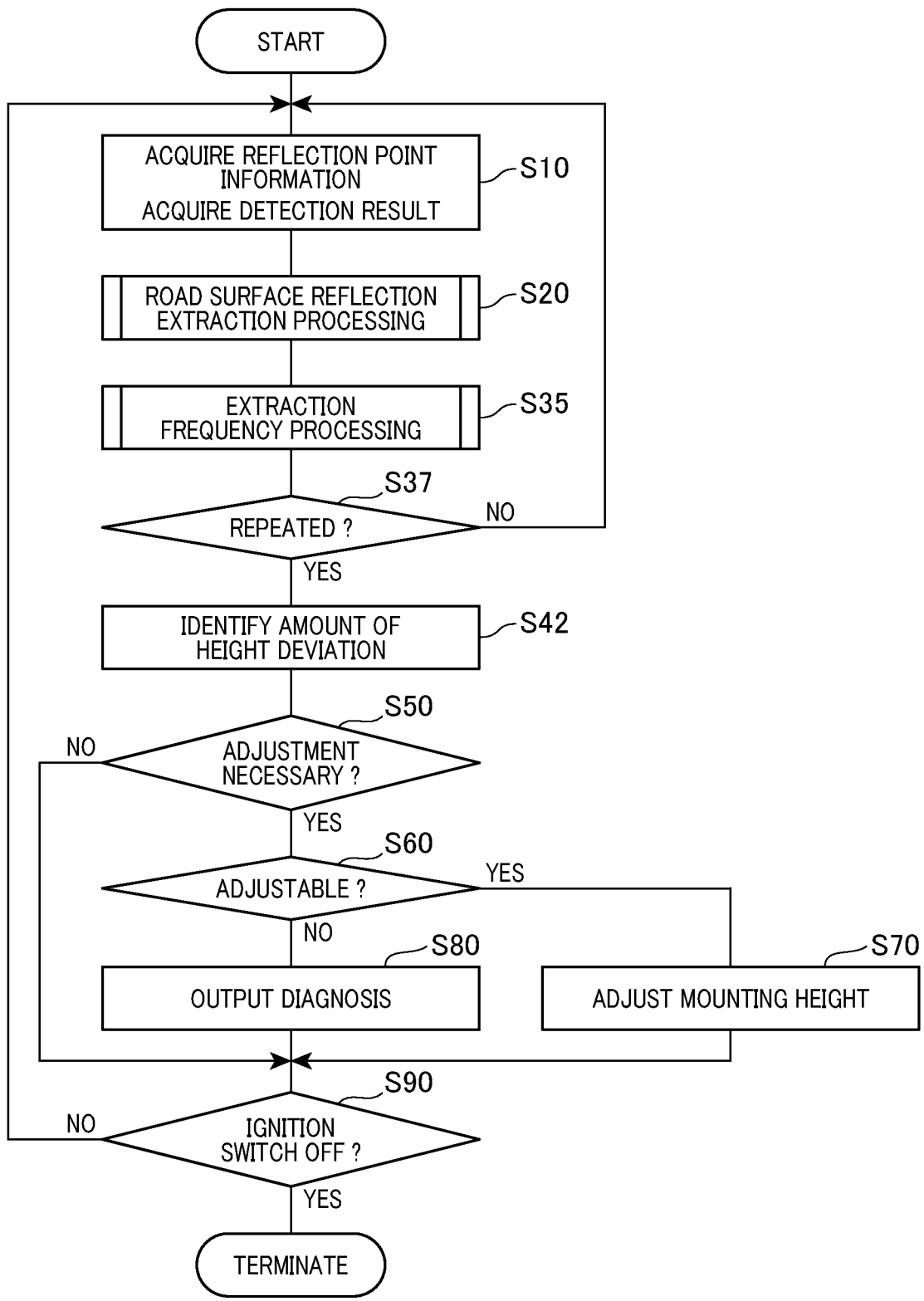
FIG. 10 is a flowchart of the adjustment processing of a second embodiment.

Next, the adjustment processing of the second embodiment executed by the signal processing unit 4 (i.e., estimation unit 46) of the second embodiment in place of the adjustment processing (i.e., FIG. 6) of the first embodiment will be described using the flowchart of FIG. 10. In accordance with the above difference, in the height deviation amount estimation processing executed by the signal processing unit 4 of the second embodiment, S30 and S40 shown in FIG. 6 are replaced by S35 and S42 shown in FIG. 10, and S37 is added to FIG. 10. The processing of S10 to S20 and S50 to S90 in FIG. 10 is the same as the processing of S10 to S20 and S50 to S90 in FIG. 6. Therefore, some of the explanations are simplified.

Figure 6:
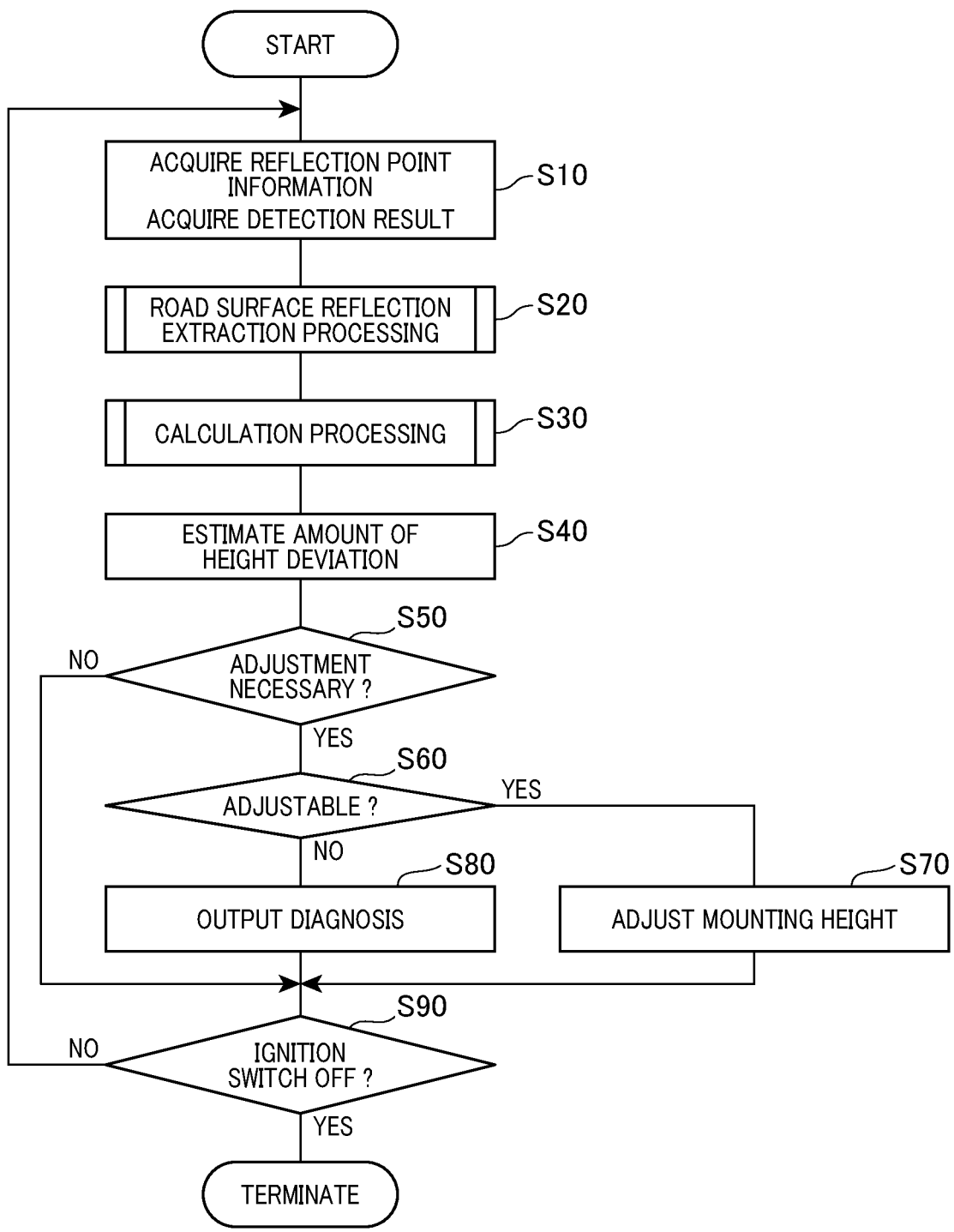
FIG. 6 is a flowchart of the adjustment processing of a first embodiment.

As for S10 to S20, the estimation unit 46 executes the same processing as that of S10 to S20 in FIG. 6.

The estimation unit 46 executes extraction frequency processing in S35 following S20. The extraction processing is to generate an extraction frequency, described later, for each road surface reflection point, and to estimate the device height using the extraction frequencies. The estimated device height is stored in the memory 42. In the extraction frequency processing, the number of times the extraction frequency processing is executed (hereinafter, "the number of extractions") K is counted and stored in the memory 42.

In the subsequent S37, the estimation unit 46 determines whether the number of extractions K is equal to or more than a predetermined extraction threshold value. When it is determined that the number of extractions K is equal to or more than the extraction threshold value, the estimation unit 46 moves the processing to S42. On the other hand, when it is determined that the number of extractions K is less than the extraction threshold value, the estimation unit 46 moves the processing to S10 and repeats the processing of S10 to S37.

The estimation unit 46 identifies the amount of height deviation in S42. In the second embodiment, the amount of height deviation refers to the difference between the device height estimated in S35 and the initial height. The estimation unit 46 stores the identified amount of height deviation in the memory 42.

As for the subsequent S50 to S90, the estimation unit 46 executes the same processing as that of S50 to S90 shown in FIG. 6.

2-2-2. Extraction Frequency Processing

Figure 11:
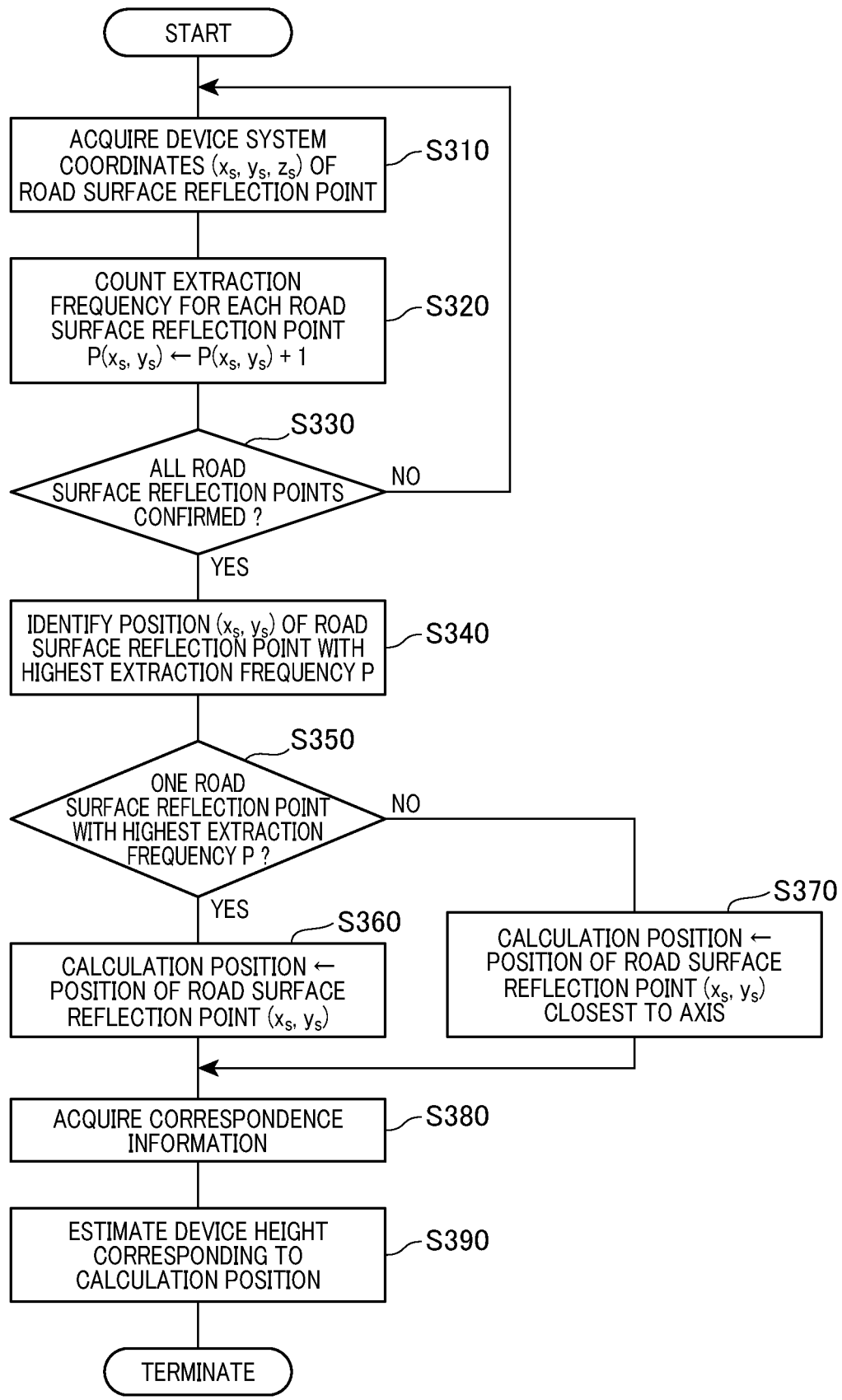
FIG. 11 is a flowchart of the extraction frequency processing of the second embodiment.

Next, the extraction frequency processing executed by the estimation unit 46 in S35 of the adjustment processing will be described using the flowchart of FIG. 11.

The estimation unit 46 acquires the device system coordinates ($x_s$, $y_s$, and $z_s$) of the road surface reflection point in S310. The estimation unit 46 may be configured to calculate the device system coordinate of at least the road surface reflection point based on the reflection point information in processing different from the adjustment processing.

In the subsequent S320, the estimation unit 46 calculates extraction frequencies, and stores the calculated extraction frequencies in the memory 42. The extraction frequency represents a numerical value obtained by adding the number of times a road surface reflection point is extracted for each position of the road surface reflection point. The position of the road surface reflection point as mentioned herein is represented by two elements ($x_s$ and $y_s$) out of the device system coordinates ($x_s$, $y_s$, and $z_s$) described above. That is, the position of the road surface reflection point as mentioned herein refers to a position on a plane representing the road surface. Hereinafter, the extraction frequency for such a position ($x_s$ and $y_s$) on the plane representing the road surface is represented by P($x_s$ and $y_s$).

Figures 12, 13:
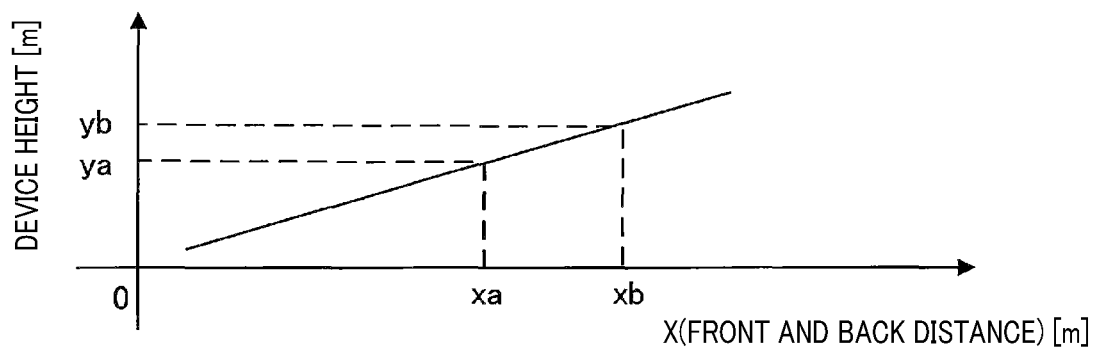
FIG. 12 is an explanatory diagram explaining the way of storing extraction frequencies.
FIG. 13 is an explanatory diagram explaining an example of correspondence information.

The extraction frequency $P(x_s$ and $y_s)$ may be stored in the memory 42 for each position $(x_s$ and $y_s)$ on the plane representing the road surface, for example, as shown in FIG. 12. In this step, the estimation unit 46 adds 1 to the extraction frequency $P(x_s$ and $y_s)$ to obtain a new extraction frequency $P(x_s$ and $y_s)$, and overwrites and stores the extraction frequency $P(x_s$ and $y_s)$ in the memory 42.

Next, the estimation unit 46 determines in S33 whether extraction frequencies $P(x_s$ and $y_s)$ have been calculated for all of the road surface reflection points extracted in S20. The estimation unit 46 moves the processing to S310 when extraction frequencies $P(x_s$ and $y_s)$ have not been calculated for all of the road surface reflection points, and moves the processing to S340 when extraction frequencies $P(x_s$ and $y_s)$ have been calculated for all of the road surface reflection points.

In S340, the estimation unit 46 identifies the position $(x_s$ and $y_s)$ of a road surface reflection point with the highest extraction frequency $P(x_s$ and $y_s)$.

Subsequently, the estimation unit 46 determines in S350 whether the number of road surface reflection points with the highest extraction frequency $P(x_s$ and $y_s)$ identified in S340 is 1. The estimation unit 46 moves the processing to S360 when the number of road surface reflection points with the highest extraction frequency $P(x_s$ and $y_s)$ is 1, and moves the processing to S370 when the number of road surface reflection points with the highest extraction frequency $P(x_s$ and $y_s)$ is plural.

The estimation unit 46 identifies a calculation position in S360 and S370. The calculation position refers to the position of the road surface reflection point with the highest extraction frequency $P(x_s$ and $y_s)$. The calculation position varies depending on the device height of the radar device 2. In general, the calculation position becomes closer to the own vehicle VH as the device height becomes lower.

In S360, the estimation unit 46 stores the position $(x_s$ and $y_s)$ of the road surface reflection point with the highest extraction frequency $P(x_s$ and $y_s)$ identified in S340 as the calculation position in the memory 42.

On the other hand, in S370, the estimation unit 46 may store, among the plurality of road surface reflection points with the highest extraction frequency $P(x_s$ and $y_s)$ identified in S340, a road surface reflection point closest to the front-back axis Xs as the calculation position in the memory 42. That is, the position of, among the plurality of road surface reflection points, a road surface reflection point in which $y_s$ is closest to 0 among the elements representing the position $(x_s$ and $y_s)$ of the road surface reflection point may be identified as the calculation position.

The present disclosure is not limited to the above. For example, in S370, the estimation unit 46 may calculate an average position by averaging the positions of the plurality of road surface reflection points with the highest extraction frequency $P(x_s$ and $y_s)$, and identify the average position as the calculation position. Alternatively, in S370, when the number of road surface reflection points with the highest extraction frequency $P(x_s$ and $y_s)$ is 3 or more, the estimation unit 46 may calculate a central position of these road surface reflection points, and identify the central position as the calculation position.

The estimation unit 46 acquires correspondence information in S380. The correspondence information may be previously stored in the ROM 43. The correspondence information can be generated in advance based on experiments, simulations, etc.

The correspondence information is based on experiments etc., and indicates the correspondence between the position of the road surface measured with the highest frequency by the radar device 2 installed at a predetermined measurement height, and the measurement height at this time. The measurement height may include a plurality of heights. Further, the position of the road surface described above can be represented by at least the front and back distance. The front and back distance is the distance from the radar device 2 in the front and back direction. That is, the front and back distance is the distance in the direction along the front-back axis Xs. In the present embodiment, the position of the road surface is represented by the front and back distance. FIG. 13 shows an example of the correspondence information.

For example, road surfaces in various states can be observed multiple times by experiments using the radar device 2 installed at a measurement height under the same conditions as when installed in the vehicle VH. Then, the position detected as the road surface with the highest frequency (i.e., front and back distance), and the measurement height at this time can be recorded. Observations may be made for a plurality of measurement heights, and correspondence information may be generated.

The estimation unit 46 identifies the measurement height corresponding to the calculation position based on the correspondence information in S390. Specifically, the measurement height corresponding to $x_s$, which is the front and back distance represented by the calculation position $(x_s$ and $y_s)$, is identified based on the correspondence information. Then, the estimation unit 46 estimates the measurement height as the device height. The estimation unit 46 stores the estimated device height in the memory 42.

In the present embodiment, in which the beam direction is consistent with the direction of the traveling direction axis Xc, the front and back distance $x_s$ represented by the calculation position $(x_s$ and $y_s)$ can be calculated based on formula (2) using the road surface reflection point distance R and the vertical angle $\theta_{Ver}$. That is, it can be said that the frequency extraction processing estimates the device height based on at least the road surface reflection point distance.

[Equation 2]

$$x_s = R \times \cos \theta_{ver} \quad (2)$$

In this step, the estimation unit 46 increments the number of extractions K, and overwrites and stores it as the new number of extractions K in the memory 42. The estimation unit 46 terminates the extraction frequency processing.

2-2-3. Operation

Figure 14:
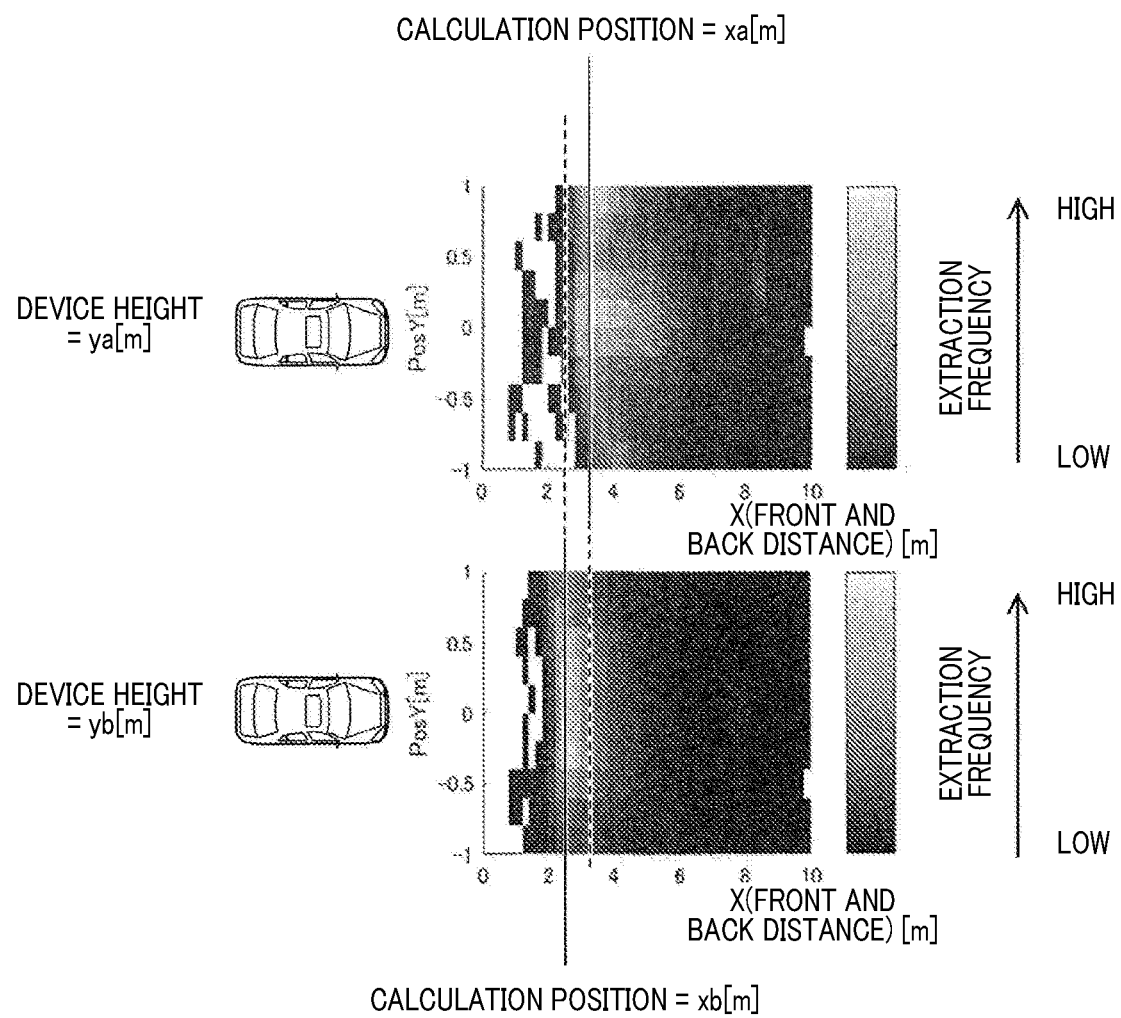
FIG. 14 is an explanatory diagram explaining an estimated example of the device height in the second embodiment.

FIG. 14 shows examples of the results of the extraction frequency processing, illustrating the extraction frequency $P(x_s$ and $y_s)$ in the position $(x_s$ and $y_s)$ of each road surface reflection point as a histogram. The example shown in the upper row of FIG. 14 is an example in which the calculation position is identified as Xa [m]. In this case, the estimation unit 46 estimates the device height as Ya [m] based on the correspondence information shown in FIG. 13. The example shown in the lower row of FIG. 14 is an example in which the calculation position is identified as Xb [m] (Xa>Xb). In this case, the estimation unit 46 estimates the device height as Yb [m] (Ya>Yb) based on the correspondence information shown in FIG. 13.

2-3. Effects

The second embodiment described in detail above exhibits the effect (1a) of the first embodiment described above, and further exhibits the following effects.

(2a) In S320, the signal processing unit 4 may generate an extraction frequency that represents a value obtained by adding the number of times a road surface reflection point is extracted in a predetermined acquisition period for each position of the road surface reflection point. The acquisition period corresponds to the period in which the extraction processing described above is repeated a number of times corresponding to the extraction threshold value described above. In S380, the signal processing unit 4 may acquire correspondence information from the memory 42. In S390, the signal processing unit 4 may identify a measurement height corresponding to the calculation position, which is the position of the road surface reflection point with the highest extraction frequency, according to the correspondence information, and may estimate the measurement height as the device height.

As a result, the signal processing unit 4 can statistically and accurately estimate the device height and the amount of height deviation based on the correspondence information.

(2b) In S35, when a plurality of positions of road surface reflection points with the highest extraction frequency are acquired, the estimation unit 46 may identify the position of a road surface reflection point closest to the front-back axis Xs as the calculation position. As a result, the device height can be estimated based on the road surface reflection point that is more accurately recognized as the road surface.

2-4. Modifications

Modification 2a

In S370, the estimation unit 46 may identify the device height based on correspondence information using a central position of the plurality of road surface reflection points with the highest extraction frequency $P(x_s$ and $y_s)$ identified in S340 as the calculation position. Alternatively, in S370, the estimation unit 46 may estimate the device height based on correspondence information using the average value of xs of the plurality of road surface reflection points with the highest extraction frequency $P(x_s$ and $y_s)$ identified in S340 as the calculation position. As a result, the variations in the positions of the road surface reflection points are averaged, and the device height can be accurately estimated.

Modification 2b

In the extraction frequency processing, the estimation unit 46 may calculate an extraction frequency corresponding to the position of a road surface reflection point represented in one dimension, rather than an extraction frequency $P(x_s$ and $y_s)$ corresponding to the position of a road surface reflection point represented in two dimensions.

That is, the extraction frequency is a value obtained by adding the number of times a road surface reflection point is extracted for each position of the road surface reflection point, and the position of the road surface reflection point may be a position represented by one element $(x_s)$ out of the device system coordinates $(x_s, y_s,$ and $z_s)$. The position as mentioned herein is a distance along the front-back axis Xs, and is represented by the front and back distance. Hereinafter, the extraction frequency of the road surface reflection point in the position $(x_s)$ is represented by $P(x_s)$.

Specifically, in this modification, the estimation unit 46 may identify, in the above extraction frequency processing, the position $(x_s)$ of a road surface reflection point with the highest extraction frequency $P(x_s)$ in S340. In S370 to which the processing moves when a plurality of road surface reflection points with the highest extraction frequency $P(x_s)$ is detected, the estimation unit 46 may identify an average value of the positions $(x_s)$ of these road surface reflection points as the calculation position.

Figure 15:
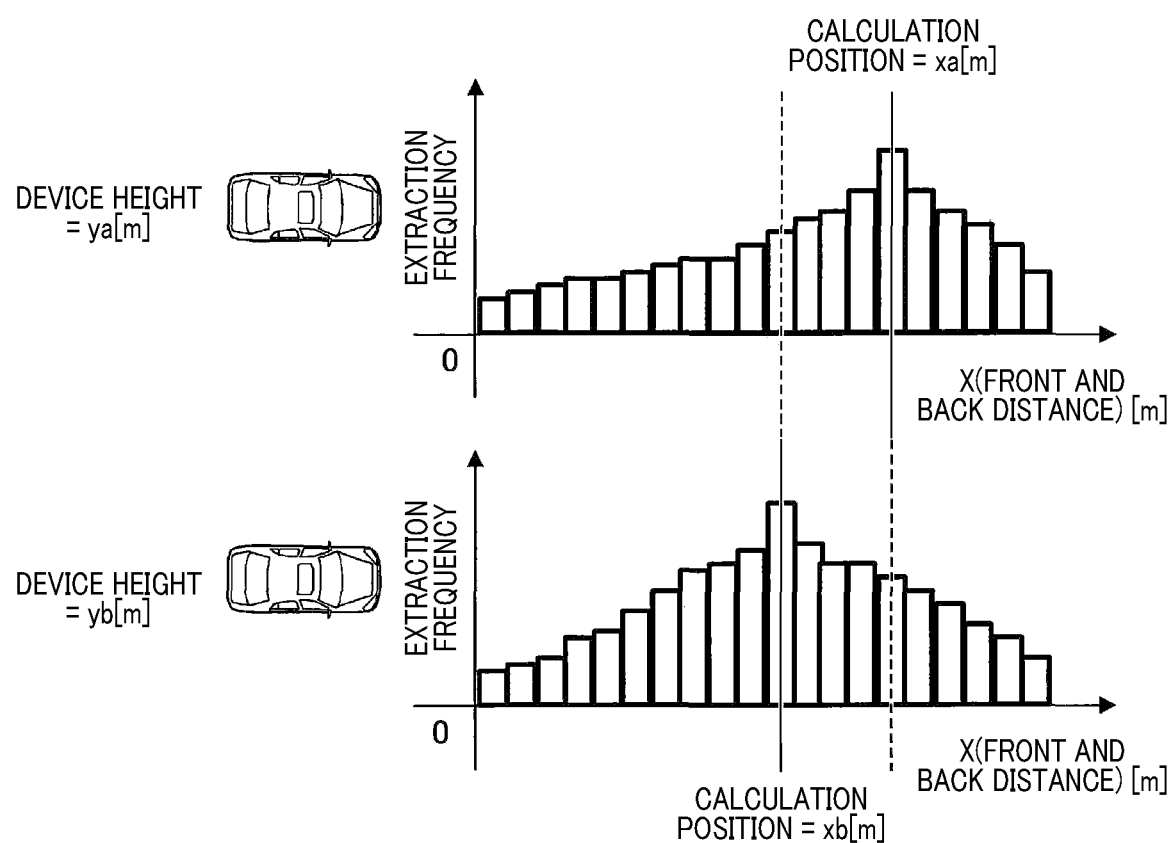
FIG. 15 is an explanatory diagram explaining an estimated example of the device height in a modification of the second embodiment.

FIG. 15 shows examples showing the results of the extraction frequency processing, illustrating the extraction frequency $P(x_s)$ in the position $(x_s)$ of each road surface reflection point as a histogram. The example shown in the upper row of FIG. 15 is an example in which the calculation position is identified as Xa [m]. In this case, the estimation unit 46 estimates the device height as Ya [m] based on the correspondence information shown in FIG. 13. The example shown in the lower row of FIG. 15 is an example in which the calculation position is identified as Xb [m] (Xa>Xb). In this case, the estimation unit 46 estimates the device height as Yb [m] (Ya>Yb) based on the correspondence information shown in FIG. 13.

3. Third Embodiment 3-1. Configuration

Since the basic configuration of the third embodiment is the same as that of the first embodiment, only the difference will be described below. The same signs as those of the first embodiment indicate the same configurations, and a reference is made to the preceding description.

In the third embodiment, the signal processing unit 4 estimates the device height based on formula (1), as in the first embodiment, estimates the device height based on the correspondence information, as in the second embodiment, and estimates the final device height based on these estimation results, which is different from the first embodiment.

Hereinafter, the device height arithmetically estimated based on formula (1) as in the first embodiment is referred to as "first height." Further, the device height statistically estimated based on the correspondence information as in the second embodiment is referred to as "second height."

3-2. Processing

Figure 16:
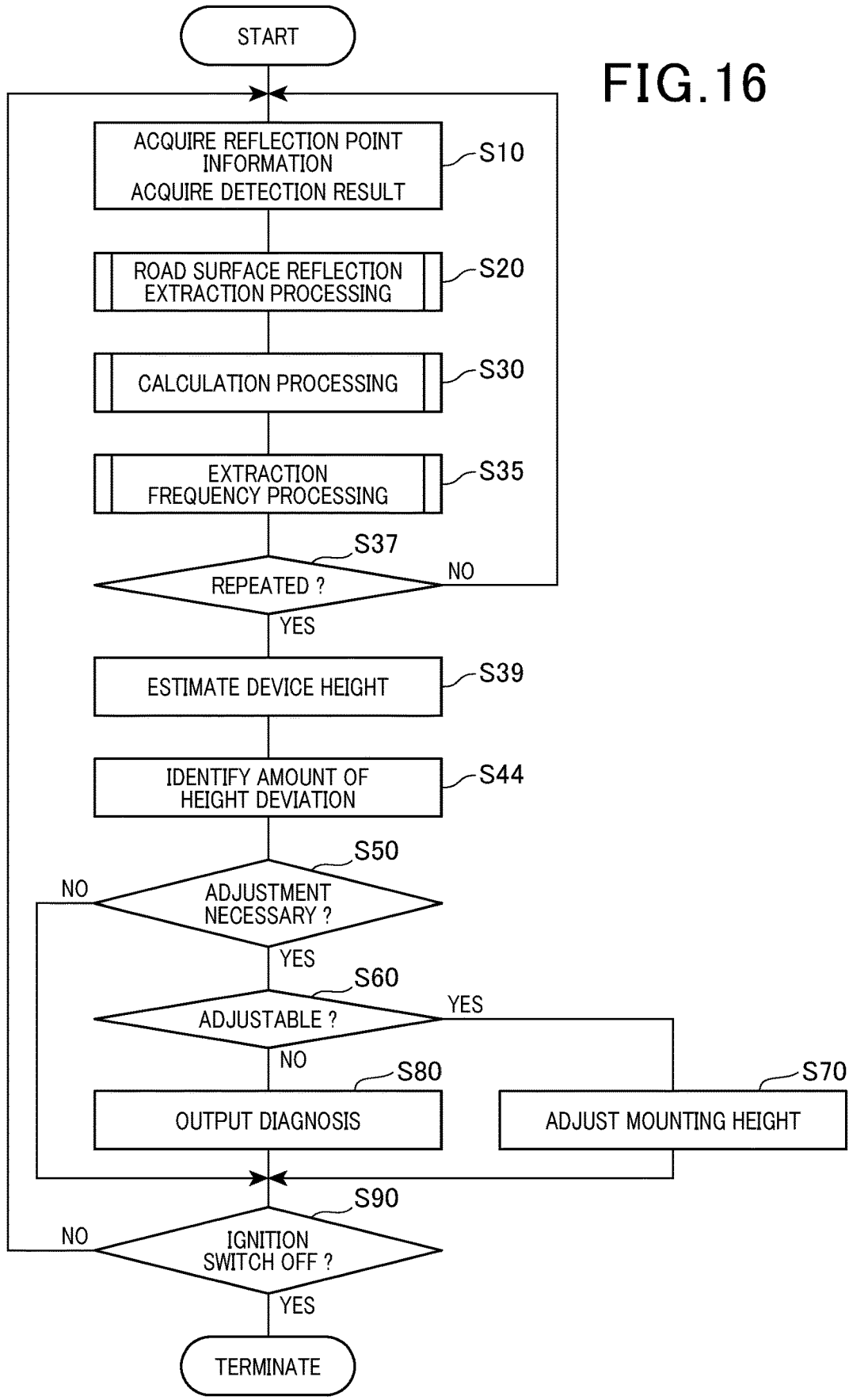
FIG. 16 is a flowchart of the adjustment processing of a third embodiment.

Next, the adjustment processing of the third embodiment executed by the signal processing unit 4 (i.e., estimation unit 46) of the third embodiment in place of the adjustment processing (i.e., FIG. 6) of the first embodiment will be described using the flowchart of FIG. 16. In accordance with the above difference, in the adjustment processing executed by the signal processing unit 4 of the third embodiment, S40 shown in FIG. 6 is replaced by S44 shown in FIG. 16, and S35, S37, and S39 are added to FIG. 16. The processing of S10 to S30 and S50 to S90 in FIG. 16 is the same as the processing of S10 to S30 and S50 to S90 in FIG. 6, and the processing of S35 and S37 in FIG. 16 is the same as the processing of S35 and S37 in FIG. 10. Therefore, some of the explanations are simplified.

As for S10 to S20, the estimation unit 46 executes the same processing as that of S10 to S20 in FIG. 6.

Next, in S30, the estimation unit 46 executes the same calculation processing as S30 in FIG. 6. However, in the third embodiment, S30 is executed repeatedly a number of times corresponding to the extraction threshold value. The estimation unit 46 may calculate an average value of the first height stored in the memory 42 and the calculated first height in S230 of the calculation processing every time S30 is executed, and overwrite and store the average value as a new first height in the memory 42.

In the subsequent S35, the estimation unit 46 executes the same extraction frequency processing as S35 in FIG. 10, and moves the processing to S37. However, the estimation unit 46 may store the estimated device height as a second height in the memory 42 in S35.

In the subsequent S37, the estimation unit 46 executes the same processing as S37 in FIG. 10.

In the subsequent S39, the estimation unit 46 calculates an average value of the first height estimated in S30 and the second height estimated in S35, and estimates the average value as the final device height. The estimation unit 46 may store the final device height in the memory 42.

In the subsequent S44, the estimation unit 46 identifies the amount of height deviation. In the third embodiment, the amount of height deviation refers to the difference between the final device height identified in S44 and the initial height. The estimation unit 46 may store the estimated amount of height deviation in the memory 42.

As for the subsequent S50 to S90, the estimation unit 46 executes the same processing as that of S50 to S90 in FIG. 6.

3-3. Effects (3a) In S39, the estimation unit 46 estimates the final device height based on the first height, which is the device height calculated in S30, and the second height, which is the device height identified in S35. As a result, the device height is estimated based on a plurality of different methods, which can further improve the accuracy of the estimated device height.

(3b) The estimation unit 46 may output the height deviation diagnosis described above to the notification device 51 that gives notification, when the amount of height deviation estimated in S44 is equal to or more than the above threshold distance and outside the above adjustable range. As a result, notification can be appropriately given based on the device height robustly estimated based on a plurality of different methods. That is, it is possible to reduce the annoyance to the passenger which would be caused by unnecessary notifications.

3-4. Modifications

Modification 3a

For example, as with (Modification 2a), in S370 of the extraction frequency processing, the estimation unit 46 may estimate the device height based on correspondence information using a central position of a plurality of road surface reflection points with the highest extraction frequency $P(x_s$ and $y_s)$ as the calculation position.

Modification 3b

For example, as with (Modification 2b), in the extraction frequency processing, the estimation unit 46 may estimate the device height based on the extraction frequency $P(x_s)$ of the road surface reflection point in the position $(x_s)$ and correspondence information.

Modification 3c

The estimation unit 46 may give notification when at least one of the following two conditions is satisfied: the amount of height deviation from the first height is not within the adjustable range (hereinafter, "first notification condition"), and the amount of height deviation from the second height is not within the adjustable range (hereinafter, "second notification condition").

In this case, the estimation unit 46 may determine whether at least one of the first notification condition and the second notification condition is satisfied, for example, in S60 shown in FIG. 16. When at least one of the first notification condition and the second notification condition is satisfied, the estimation unit 46 may move the processing to S80 and output height deviation diagnosis. On the other hand, when neither of the first notification condition nor the second notification condition is satisfied, the estimation unit 46 may move the processing to S70 and perform mounting height adjustment.

Modification 3d

The estimation unit 46 may give notification only when both of the first notification condition and the second notification condition are satisfied. In this case, the estimation unit 46 may determine whether both of the first notification condition and the second notification condition are satisfied, for example, in S60 shown in FIG. 16. When both of the first notification condition and the second notification condition are satisfied, the estimation unit 46 may move the processing to S80 and output height deviation diagnosis. On the other hand, when at least one of the first notification condition and the second notification condition is not satisfied, the estimation unit 46 may move the processing to S70 and perform mounting height adjustment.

4. Other Embodiments

The embodiments of the present disclosure are described above; however, the present disclosure is not limited to the above embodiments, and can be carried out with various modifications.

(3a) In the above embodiments, the radar device 2 is installed so that the beam direction is consistent with the traveling direction of the own vehicle VH; however, the present disclosure is not limited thereto. For example, the radar device 2 may be installed so that the beam direction is inclined at a preset angle in the vertical direction or horizontal direction. The preset angle that expresses the inclination of the beam direction may be previously stored in the memory 42.

(3b) The signal processing unit 4 and the method thereof described in the present disclosure may be realized by a dedicated computer provided by configuring a processor and memory programmed to perform one or more functions embodied in a computer program. Alternatively, the signal processing unit 4 and the method thereof described in the present disclosure may be realized by a dedicated computer provided by configuring a processor with one or more dedicated hardware logic circuits. Alternatively, the signal processing unit 4 and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer. The method for realizing the function of each unit included in the signal processing unit 4 does not necessarily have to include software. Some or all of the functions may be realized using one or more hardware components.

(3c) A plurality of functions possessed by a single constituent element in the embodiments described above may be realized by a plurality of constituent elements, or a single function possessed by a single constituent element may be realized by a plurality of constituent elements. Further, a plurality of functions possessed by a plurality of constituent elements may be realized by a single constituent element, or a single function realized by a plurality of constituent elements may be realized by a single constituent element. Moreover, some of the configurations of the embodiments described above may be omitted. In addition, at least some of the configurations of the embodiments described above may be added to or replaced with the configurations of the other embodiments described above.

(3d) In addition to the signal processing unit 4 described above, the present disclosure can be realized in various forms, such as a vehicle control system 1, a program for allowing the signal processing unit 4 to function, a non-transitory tangible storage medium, such as a semiconductor memory, storing the program, a height deviation estimation method, and the like.

In the above embodiments, the own vehicle VH corresponds to the mobile object, the signal processing unit 4 corresponds to the estimation device, and the memory 42 corresponds to the storage device. Further, S10 corresponds to the processing as the acquisition unit, S20 corresponds to the processing as the extraction unit, S30 corresponds to the processing as the estimation unit and calculation unit, and S35 corresponds to the processing as the estimation unit and identification unit. S39 corresponds to the processing as the estimation unit and composite unit, S40, S42, and S44 correspond to the processing as the deviation amount identification unit, and S380 corresponds to the processing as the correspondence acquisition unit. Further, the amount of height deviation corresponds to the amount of deviation.

What is claimed is:

1. An estimation device mounted to a mobile object, comprising:
    an acquisition unit configured to acquire reflection point information for each of a plurality of reflection points detected by a radar device mounted to the mobile object, the reflection point information including at least an azimuth angle of the corresponding one of the reflection points and the distance from the radar device to the corresponding one of the reflection points, the azimuth angle being a horizontal angle and a vertical angle obtained with reference to a beam direction which is a direction along a central axis of a radar beam;
    an extraction unit configured to extract, among the plurality of reflection points, at least one road surface reflection point detected by reflection on a road surface, based on at least the reflection point information; and
    a correspondence acquisition unit configured to acquire correspondence information from a storage device that stores the correspondence information, the correspondence information indicating respective correspondences between each individual measurement height of a plurality of measurement heights and a respective position of a road surface observed the most by the radar device installed at the individual measurement height; and
    an estimation unit configured to estimate a device height which is a height of the radar device mounted to the mobile object, based on at least a road surface reflection point distance which is a distance from the radar device to the road surface reflection point; wherein the estimation unit comprises an identification unit configured to:
        acquire an extraction frequency that represents a value obtained by adding the number of times the road surface reflection point is extracted in a predetermined acquisition period for each position of the road surface reflection point,
        identify a calculation position, which represents a position of the road surface reflection point with the highest extraction frequency, and
        identify, a first height as the device height, the first height being identified as the measurement height corresponding to the calculation position according to the correspondence information.

2. The estimation device according to claim 1, wherein the estimation unit further comprises a calculation unit configured to calculate a second height as the device height, the second height being calculated as an unknown parameter based on a relational expression established between the unknown parameter, the road surface reflection point distance, and the vertical angle.

3. The estimation device according to claim 2, wherein the estimation unit further comprises a composite unit configured to estimate the device height based on the first height and the second height.

4. The estimation device according to claim 1, further comprising a deviation amount identification unit configured to identify an amount of deviation, the amount of deviation representing the degree of deviation in a height direction occurring in the radar device.

5. The estimation device according to claim 4, wherein the deviation amount identification unit is configured to:
    acquire an initial height, the initial height being a predetermined height of the radar device when mounted to the mobile object, and
    identify a difference between the initial height and the estimated height as the amount of deviation.

6. The estimation device according to claim 1, wherein the extraction unit is configured to:
    determine whether a vehicle body of the mobile object is stable relative to a road surface, and
    extract the road surface reflection point in response to determining that the vehicle body of the mobile object is stable relative to the road surface.

* * * * *